United States Patent [19]

Sano

[11] Patent Number: 5,214,984
[45] Date of Patent: Jun. 1, 1993

[54] PRESSURE CONTROL SYSTEM FOR AUTOMOTIVE AUTOMATIC POWER TRANSMISSION WITH FEATURE OF FLUID PRESSURE DEPENDENT ACTUATOR CONTROL

[75] Inventor: Kunihiko Sano, Shizuoka, Japan

[73] Assignee: Jatco Corporation, Japan

[21] Appl. No.: 621,876

[22] Filed: Dec. 4, 1990

[51] Int. Cl.$^5$ .................. B60K 41/06; G06G 7/70
[52] U.S. Cl. .......................... 74/867; 74/856; 74/857; 364/424.1
[58] Field of Search .............. 74/856, 857, 867; 364/424.1

[56] References Cited

U.S. PATENT DOCUMENTS

| | | | |
|---|---|---|---|
| 2,997,144 | 8/1961 | Gsching et al. | 74/857 X |
| 3,621,735 | 11/1971 | Lemieux | 475/120 |
| 3,918,312 | 11/1975 | Espenchied et al. | 74/867 X |
| 4,628,771 | 12/1986 | Person et al. | 74/856 |
| 4,638,691 | 1/1987 | Tanaka | 74/856 X |
| 4,680,992 | 7/1987 | Hayasaki et al. | 74/869 |
| 4,781,080 | 11/1988 | Iwatsuki | 74/867 |
| 4,939,502 | 7/1990 | Ito et al. | 364/424.1 X |
| 4,955,259 | 9/1990 | Narita | 74/867 X |
| 5,016,174 | 5/1991 | Ito et al. | 74/867 X |
| 5,016,494 | 5/1991 | Yamaguchi | 74/857 X |
| 5,033,330 | 6/1991 | Okahara | 74/867 |
| 5,042,328 | 8/1991 | Morishige et al. | 74/867 X |
| 5,079,971 | 1/1992 | Yoshimura et al. | 74/867 X |
| 5,088,353 | 2/1992 | Yoshida | 74/866 |
| 5,097,723 | 3/1992 | Hayasaki | 74/866 |

FOREIGN PATENT DOCUMENTS 62-62047 3/1987 Japan.

Primary Examiner—Leslie A. Braun
Assistant Examiner—David E. Henn
Attorney, Agent, or Firm—Ronald P. Kananen

[57] ABSTRACT

A pressure control system is designed to disable action of a duty controlled solenoid while fluid pressure is not supplied. Namely, the pressure control system monitors a fluid pressure in a hydraulic circuit to detect the fluid pressure lower than a predetermined pressure criterion. When the fluid pressure lower than the pressure criterion is detected, the solenoid is disabled.

2 Claims, 5 Drawing Sheets

FIG. 2

| | | C18 | C20 | C22 | C24 | B28 | B26 | OWC 30 | OWC 29 | GEAR RATIO | $\alpha_1 = 0.440$<br>$\alpha_2 = 0.493$ |
|---|---|---|---|---|---|---|---|---|---|---|---|
| D RANGE | 1ST. | | | ○ | | | | ○ | ○ | $\frac{1+\alpha_2}{\alpha_2}$ | 3.027 |
| | 2ND. | | ○ | ○ | | ○ | | ○ | | $\frac{\alpha_1+\alpha_2+\alpha_1\alpha_2}{\alpha_2(1+\alpha_1)}$ | 1.619 |
| | 3RD. | | ○ | ○ | ○ | | | ○ | | 1 | 1.000 |
| | 4TH. | | | (○) | ○ | ○ | | | | $\frac{1}{1+\alpha_1}$ | 0.694 |
| ENGINE BRAKING STATE | 1ST. | | | (○) | | | ○ | (○) | (○) | | |
| | 2ND. | | | (○) | ○ | ○ | | (○) | | | |
| | 3RD. | | ○ | (○) | ○ | | | (○) | | | |
| | 4TH. | | ○ | (○) | | ○ | | | | | |
| REVERSE | | ○ | | | | | ○ | | | $-\frac{1}{\alpha_1}$ | -2.272 |

( ) NOT EFFECTIVE FOR POWER TRANSMISSION

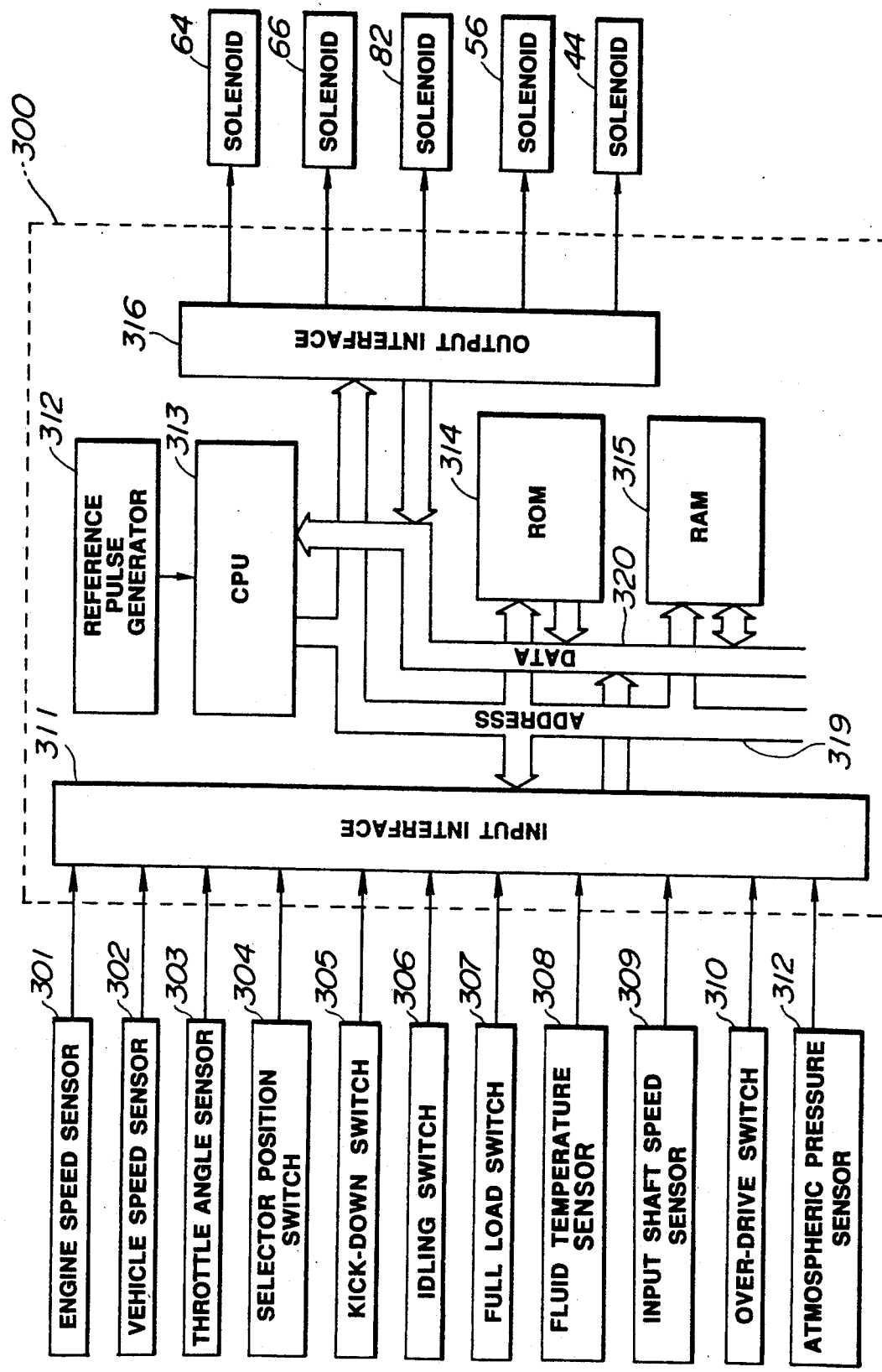

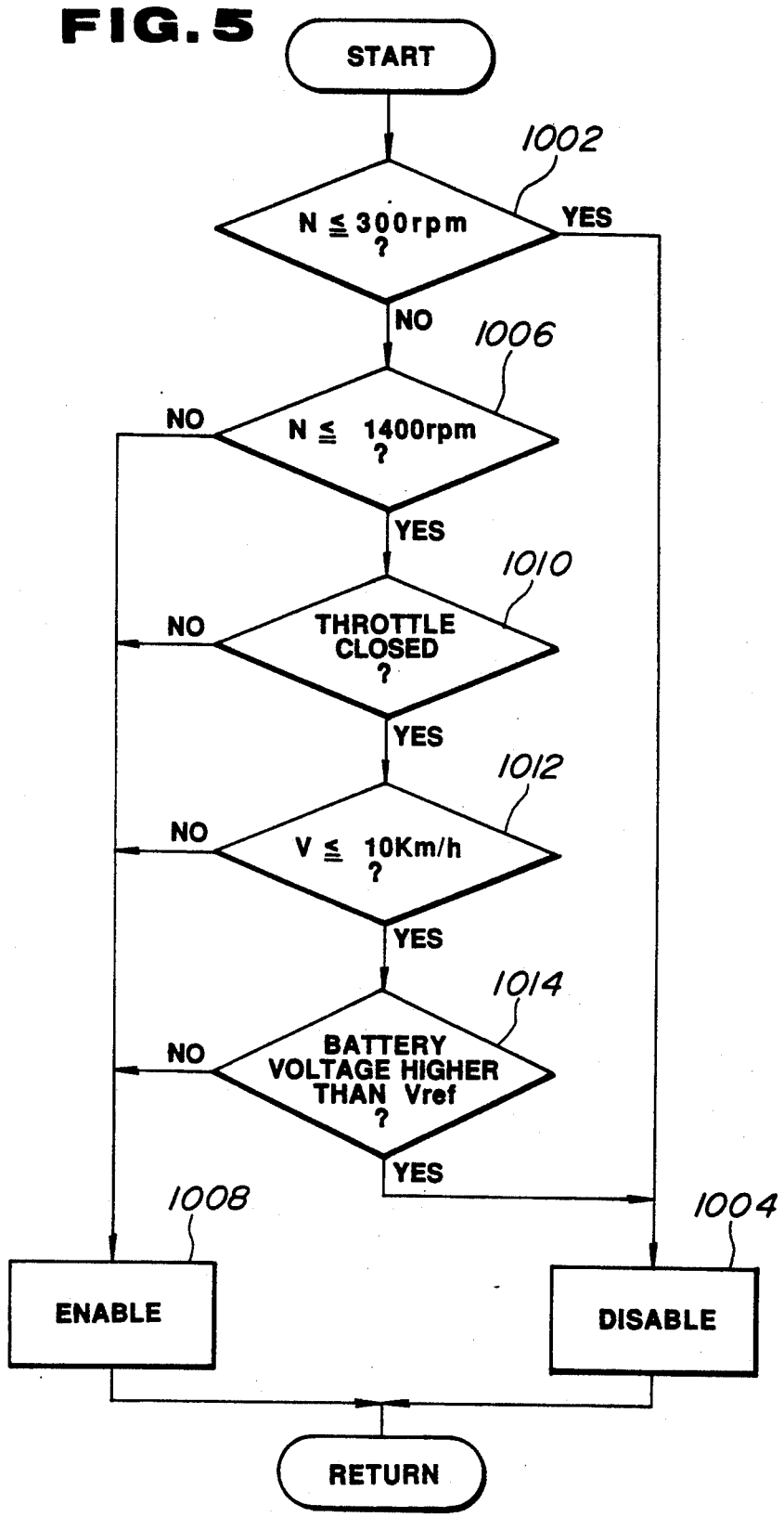

PRESSURE CONTROL SYSTEM FOR AUTOMOTIVE AUTOMATIC POWER TRANSMISSION WITH FEATURE OF FLUID PRESSURE DEPENDENT ACTUATOR CONTROL

BACKGROUND OF THE INVENTION

1. Field of the Invention

The present invention relates generally to a pressure control system for an automatic power transmission for an automotive vehicle. More specifically, the invention relates to a pressure control system for an electronically or electrically controlled automatic power transmission which can enhance durability of an electrically operated actuator.

2. Description of the Background Art

U.S. Pat. No. 3,621,735 discloses a pressure control system for an automatic power transmission, which employs a duty controlled solenoid. The duty controlled solenoid receives a periodic signal having a given duty cycle and controls a ratio of an opening period and a closing period of a fluid flow restricting orifice. By periodically opening and closing the flow restriction orifice, a magnitude of signaling pressure for a pressure regulator valve is adjusted. The pressure regulator valve is responsive to the signaling pressure to vary line pressure in a hydraulic circuit of the automatic power transmission.

In such conventional construction, the solenoid is responsive to the periodic signal to perform a signaling pressure adjusting operation irrespective of the status of the hydraulic circuit. For instance, even when the line pressure is not supplied, the solenoid becomes active in response to the periodic signal to perform adjustment of the signaling pressure. In such case, the plunger of the solenoid contacts against the orifice in absence of the working fluid to cause a shortening of the effective life of the solenoid.

SUMMARY OF THE INVENTION

Therefore, it is an object of the present invention to provide a pressure control system which can solve the problem in the prior art and thus can provide a longer life for the solenoid.

In order to accomplish the aforementioned and other objects, a pressure control system, according to the present invention, is designed to disable action of a duty controlled solenoid while fluid pressure is not supplied. Namely, according to the present invention, the pressure control system monitors a fluid pressure in a hydraulic circuit to detect a fluid pressure lower than a predetermined pressure criterion. When a fluid pressure lower than the pressure criterion is detected, the solenoid is disabled.

According to one aspect of the invention, a pressure control system for an automotive automatic power transmission, comprises:

a hydraulic circuit connected to friction elements of the automatic power transmission for varying status of respective friction elements for establishing various speed ratios during transmission of an output torque of an automotive internal combustion engine;

a duty controlled solenoid disposed in the hydraulic circuit for adjusting line pressure to be supplied to the hydraulic circuit according to a duty ratio of an electric control signal; and means, associated with the duty controlled solenoid, for selectively enabling and disabling the duty controlled solenoid depending upon fluid pressure supplied to the hydraulic circuit.

Preferably, the hydraulic circuit is also connected to a pressurized fluid source which is driven by the automotive internal combustion engine, and the enabling and disabling means are responsive to the fluid pressure supplied from the pressurized fluid source. In such case, the enabling and disabling means may detect fluid pressure lower than a predetermined value to disable the duty controlled solenoid.

In order to detect fluid pressure lower than the predetermined value, the enabling and disabling means may detect the fluid pressure lower than the predetermined value on the basis of an engine revolution speed. Furthermore, the enabling and disabling means may detect an engine load condition for disabling the duty controlled solenoid when the engine revolution speed is below a first engine speed criterion and the engine load is lower than a predetermined low engine load criterion. In the alternative, the enabling and disabling means may detect a vehicle traveling speed below a predetermined vehicle speed criterion to disable the duty controlled solenoid when the engine revolution speed is below a first engine speed criterion and the vehicle traveling speed is lower than the vehicle speed criterion. In the further alternative, the enabling and disabling means may detect a supply voltage from an electric power source higher than a predetermined voltage criterion for disabling the duty controlled solenoid when the engine revolution speed is below the first engine speed criterion and the supply voltage is higher than the voltage criterion.

Preferably, in the preferred embodiment, the enabling and disabling means may be responsive to the engine speed below a second engine speed criterion which is set at a lower engine speed than the first engine speed criterion, to disable the duty controlled solenoid irrespective of other parameters.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 2 is a table showing active elements in the automatic power transmission of FIG. 1 at variations in their operational range;

FIG. 4 is a block diagram of the preferred embodiment of a control unit designed for implementing the preferred process of fluid pressure control; and FIG. 5 is a flowchart showing a routine for controlling operation of a pressure control solenoid.

DESCRIPTION OF THE PREFERRED EMBODIMENT

Figure 1:
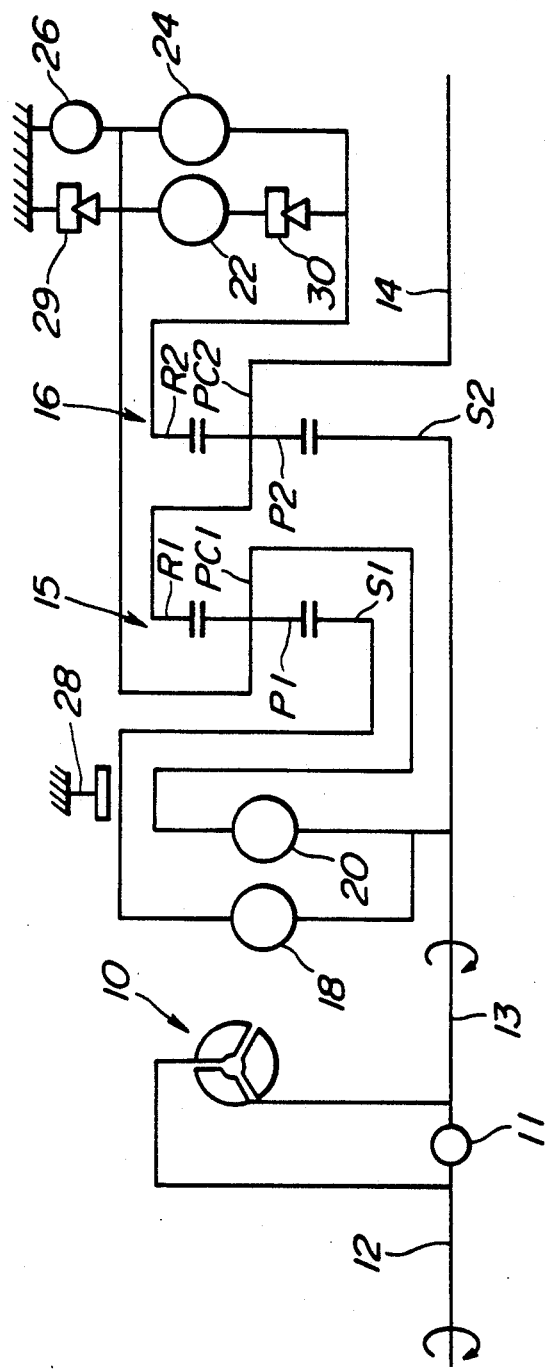
FIG. 1 is a schematic diagram showing an automatic power transmission for which the preferred embodiment of a pressure control system according to the present invention is applicable.

Referring now to the drawings, particularly to FIG. 1, there is shown an automatic power transmission which has a power train of four forward speed ratios and one reverse speed ratio. The power transmission mechanism includes an input or turbine shaft 13 connected to an output shaft 12 of an automotive internal combustion engine as a prime mover, via a torque converter 10. The power transmission mechanism also includes an output shaft 14 for transmitting driving torque to a final drive. The torque converter 10 has a pump impeller, a turbine runner and a stator. The pump impeller is connected to the engine output shaft. On the other hand, the turbine runner is connected to the input shaft 13. The pump impeller is also connected to an oil pump for driving the latter. Between the input shaft 13 and the output shaft 14, a first planetary gear set 15, a second planetary gear set 16, a reverse clutch (R/C) 18, a high clutch (H/C) 20, a forward clutch (F/C) 22, an overrun clutch (OR/C) 24, a low-and-reverse clutch (L&R/C) 26, a band brake (B/B) 28, a low one-way clutch (LO/C) 29 and a forward one-way clutch (FO/C) 30. The torque converter incorporates a lock-up clutch 11. The first planetary gear set 15 includes a sun gear $S_1$, a ring gear $R_1$, pinions $P_1$ and a pinion carrier $PC_1$ which supports the pinions. Similarly, the second planetary gear set 16 includes a sun gear $S_2$, a ring gear $R_2$, pinions $P_2$ and a pinion carrier $PC_2$ which supports the pinions.

The pinion carrier $PC_1$ supporting the pinions $P_1$ is so designed as to connectably associated with the input shaft 13 via the high clutch (H/C) 20. The pinion carrier $PC_1$ is also connected to the ring gear $R_2$ of the second planetary gear set 16 via a forward clutch (F/C) 22 and a forward one-way clutch (FO/C) 30 which is coupled with the forward clutch in series, or in the alternative, via the forward clutch (F/C) 22 and the overrun clutch (OR/C) 24 which is provided in parallel to the forward one-way clutch (FO/C) 30. The pinion carrier $PC_1$ is adapted to be anchored by a low and reverse brake (L&R/B) and its reverse rotation is prevented by the low one-way clutch (LO/C). The sun gear $S_1$ of the first planetary gear set 15 is so designed as to be connectably associated with the input shaft 13 via a reverse clutch (R/C) 18. The sun gear $S_2$ of the second planetary gear set 16 is constantly connected to the input shaft 13. The ring gear $R_1$ of the first planetary gear set 15 and the pinion carrier $PC_2$ of the second planetary gear set 16 are constantly connected to the output shaft 14. The ring gear $R_1$ is integrally connected with the pinion carrier $PC_2$ of the second planetary gear set 16. The sun gear $S_2$ of the second planetary gear set 16 is connected to the input shaft 13. The ring gear $R_2$ is connectably associated with the pinion carrier $PC_1$ via the overrun clutch (OR/C) 24. In order to establish a predetermined drive relation, the forward one-way clutch (FO/C) 30 and the forward clutch (F/C) 22 are arranged between the pinion carrier $PC_1$ and the ring gear $R_2$ of the second planetary gear set 16. Engagement of the forward clutch (F/C) 22 causes the forward one-way clutch (FO/C) 30 to connect the ring gear $R_2$ with the pinion carrier $PC_1$ in the reverse rotational direction.

A low and reverse brake (L&R/B) 26 can fix the pinion carrier $PC_1$. On the other hand, the band brake (B/B) 28 can fix the sun gear $S_1$. A low one-way clutch (LO/C) 29 permits rotation of the pinion carrier $PC_1$ in a forward direction (i.e., the same direction as the rotating direction of the engine output shaft 12) and prevents the pinion carrier $PC_1$ from rotating in a reverse direction (i.e., opposite to the rotating direction in the forward direction).

The power train as set forth above has selectable power transmission modes by a combination of the states of one or more frictional elements, i.e. the reverse clutch R/C 18, the high clutch (H/C) 20, the forward clutch (F/C) 22, the overrun clutch (OR/C) 24, the low and reverse brake (L&R/B) 26 and the band brake (B/B) 28, to establish various modes of operation of the components of the sun gears $S_1$ and $S_2$, the ring gears $R_1$ and $R_2$ and, the pinion carriers $PC_1$ and $PC_2$ of the first and second planetary gear sets 15 and 16. With various modes of the first and second planetary gear sets 15 and 16, rotation speed at the output shaft 14 versus the rotation speed of the input shaft 13 is varied at various rates. Active components at respective operational modes of the transmission are illustrated by indicating (0) in respective columns in FIG. 2.

In the shown construction, an apply chamber 11a and a release chamber 11b are defined in the torque converter 10 in order to control the state of the lock-up clutch 11. Namely, when the fluid pressure is supplied to the release chamber 11b, the lock-up clutch 11 is released and when the fluid pressure is supplied to the apply chamber 11a, the lock-up clutch 11 is engaged for establishing lock-up condition. The band brake (B/B) 28 defines a second speed servo apply chamber 28a, a third speed servo release chamber 28b and a fourth speed servo apply chamber 28c. With this construction, when the second speed pressure is supplied to the second servo apply chamber 28a, the band brake (B/B) 28 is applied; when the third speed pressure is supplied to the third speed servo release chamber 28b, the band brake is released; and when the fourth speed pressure is supplied to the fourth speed servo apply chamber 28c, the band brake is applied.

Figure 3:
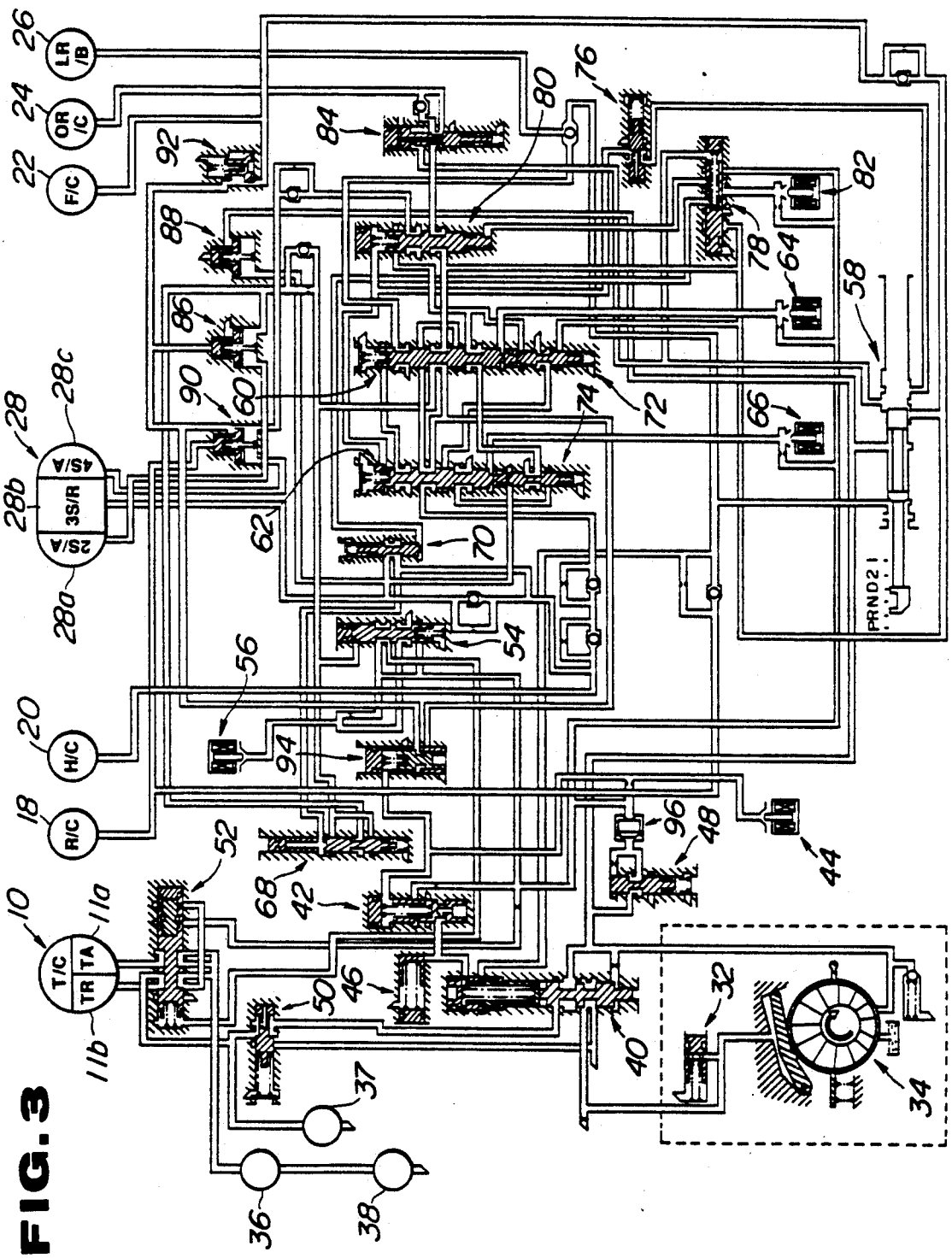
FIG. 3 is a diagram showing a preferred construction of a hydraulic circuit employed in the automatic power transmission for selecting an operational range among the ranges in FIG. 2.

FIG. 3 illustrates a hydraulic circuit for controlling operational modes of the above-mentioned automatic power transmission. As can be seen from FIG. 3, the hydraulic circuit includes a pressure regulator valve 40, a pressure modifier valve 42, a line pressure solenoid 44, a modifier pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a fast reducing valve 76, a second shuttle valve 78, an overrunning clutch control valve 80, an overrunning clutch solenoid 82, an overrunning clutch reducing valve 84, an 1-2 accumulator 86, a 2-3 accumulator 88, a 3-4 accumulator 90, an N-D accumulator 92, an accumulator control valve 94, a filter 96 and so forth. These components are disposed in the hydraulic circuit as shown in FIG. 3.

A variable displacement vane type oil pump 34 with a feedback accumulator 32, an oil cooler 36, a front lubricating circuit 37 and a rear lubricating circuit 38 are also provided in the hydraulic circuit.

It should be noted that the components in the hydraulic circuit set forth above are essentially the same or similar in construction and function to that in an automatic power transmission known as NISSAN Full-Range Automatic Power Transmission Type RE4R-01A. The similar hydraulic circuit with the associated components have also been disclosed in the U.S. Pat.

No. 4,680,992, issued on Jul. 21, 1987 to Hayasaki et al. and in "NISSAN FULL-RANGE ELECTRONICALLY CONTROLLED AUTOMATIC TRANSMISSION SERVICE MANUAL" published by Nissan Motor Co., Ltd. in March, 1987. Furthermore, Japanese Patent First (unexamined) Publication (Tokkai) Showa 62-62047 also discloses a similar construction of the hydraulic circuit for an automatic power transmission. The disclosures in the foregoing publications are herein incorporated by reference for the sake of disclosure.

FIG. 4 is a block diagram of the preferred embodiment of a control system according to the invention. The control unit 300 is composed of a microprocessor-based data processing unit. The control unit 300 includes an input interface 311, a CPU 313, a ROM 314, a RAM 315 and an output interface 316. These components of the control unit 300 are connected through an address bus 319 and a data bus 320. In addition, the CPU 313 is connected to a reference pulse generator 312. In order to provide various transmission control parameters for enabling the control unit 300, an engine speed sensor 301, a vehicle speed sensor 302, a throttle angle sensor 303, a selector position switch 304, a kick-down switch 305, an idling switch 306, a full load switch 307, a fluid temperature sensor 308, an input shaft speed sensor 309, an over-drive switch 310 and an atmospheric pressure sensor 321 are connected to the input interface 311 of the control unit 300.

The engine speed sensor 301 may comprise a crank angle sensor monitoring crankshaft angular position to produce a crank reference signal at every predetermined angular position of the crankshaft and crank position signal at every predetermined angular displacement of the crankshaft. The engine speed sensor 301 may further comprise an engine speed counter counting up the crank reference signal over a predetermined period for deriving an engine revolution speed to output an engine speed indicative signal N. The vehicle seed sensor 302 has a per se well known construction and thus produces a vehicle speed indicative signal V. The throttle angle sensor 303 is associated with a throttle valve in an air induction system of an internal combustion engine. The throttle angle sensor 303 monitors the throttle valve angular position and produces a throttle valve angular signal TVO. The selector position switch 304 is associated with a selector lever of the transmission to detect the selector position and thereby produces a selector position indicative signal SEL representative of the selector position. The kick-down switch 305 is associated with an accelerator pedal greater than a predetermined magnitude to produce a kick-down demand indicative signal.

The idle switch 306 is designed for detecting a fully closed or an approximately fully closed position of the throttle valve to produce an engine idling condition indicative signal. The full load switch 307 is provided for detecting a fully open position of the throttle valve to produce a full load condition indicative signal. The fluid temperature sensor 308 monitors temperature of lubricant in the transmission to produce a fluid temperature indicative signal. The input shaft speed sensor 309 monitors rotation speed of the transmission input shaft 13 to produce an input shaft speed indicative signal. The input shaft speed sensor 309 monitors rotation speed of the transmission input shaft 13 to produce an input shaft speed indicative signal. The over-drive switch 310 is associated with the selector lever for manual operation for selecting over-drive or fourth speed ratio enabling state and inhibiting state for producing over-drive enabling state indicative signal when it is enabled.

The atmospheric pressure sensor 321 monitors an atmospheric pressure to produce an atmospheric pressure indicative signal P. Though the shown embodiment employs the atmospheric pressure sensor, it may be replaced with an altitude sensor for monitoring altitude level of the vehicle as a parameter equivalent to the atmospheric pressure.

Employing the sensors and switches, the control unit 300 performs various transmission control operations for optimization. FIG. 5 shows process of speed ratio selection and line pressure control implemented by the preferred embodiment of the control system according to the invention. FIG. 5 shows a routine for enabling and disabling of the line pressure solenoid 44. In the shown process, the line pressure solenoid 44 is enabled and disabled depending upon the vehicle driving condition. The engine speed indicative signal N, the throttle valve angular signal TVO, and the vehicle speed indicative signal V are employed as parameters for controlling status of the line pressure actuator 44. In the shown embodiment, the line pressure solenoid 44 is disabled whenever the engine revolution speed is lower than or equal to 300 rpm. Also, the line pressure solenoid 44 is disabled when the engine revolution speed is lower than or equal to 1400 rpm, the throttle valve is fully closed or substantially fully closed, the vehicle speed is lower than or equal to 10 km/h, and the battery voltage is higher than or equal to a predetermined value.

In order to implement in the foregoing, the process as shown in FIG. 5, the engine speed indicative signal value N is read out at a step 1002 immediately after starting execution. At the step 1002, the engine speed indicative signal value N is checked whether it represents an engine speed lower than or equal to 300 rpm. The specific engine speed hereafter set out is mere example but represents the engine condition at which the engine is substantially stopping. Namely, in the normal automotive engine, an idling speed at a no load condition is set at about 600 rpm or higher. Therefore, when the engine speed is lower than or equal to 300 rpm, judgement can be made that the engine is stopping. In such case, the line pressure solenoid 44 is disabled at a step 1004.

On the other hand, when the engine speed indicative signal value N represents an engine speed higher than 300 rpm as checked at the step 1002, the engine speed indicative signal value N is checked whether it represents 1400 rpm which serves as a low engine speed criterion. The low engine speed criterion may be set at a possible highest engine idling speed at a no load condition, at a step 1006. If the engine speed is higher than 1400 rpm, process goes to a step 1008 to enable the operation of the line pressure solenoid 44. On the other hand, if the engine speed N as checked at the step 1006 is lower than or equal to 1400 rpm, a check is performed whether the throttle valve is fully closed or the open angle thereof is substantially small to be judged that the throttle valve is nearly fully closed, at a step 1010. In practice, at the step 1010, the throttle angle indicative signal value TVO is compared with a throttle open angle criterion to make judgement when the throttle angle indicative signal value TVO is smaller than the throttle open angle criterion. If the throttle valve open angle is greater than or equal to the throttle open angle criterion, the process goes to the step 1008 to enable the operation of the line pressure solenoid 44. If the throttle valve open angle is smaller than the throttle open angle criterion as checked at the step 1010, the vehicle speed is checked whether it is lower than a predetermined low vehicle speed criterion, e.g. 10 km/h, at a step 1012. Similarly, when the vehicle speed is higher than the low vehicle speed criterion, the process goes to the step 1008. On the other hand, when the vehicle speed is lower than or equal to the low vehicle speed criterion, the battery voltage is checked if it is higher than or equal to the predetermined value $V_{ref}$. If battery voltage is higher than or equal to the predetermined value, the process goes to the step 1004 to disable the line pressure solenoid 44. Otherwise, the process goes to the step 1008. After processing process at one of the steps 1004 and 1008 the process goes to an END.

Through the process set forth above, operation of the line pressure solenoid while the fluid pressure supplied from the pressure source is low can be successfully prevented. As a result, durability of the solenoid can be prolonged.

Therefore, the invention fulfills all of the objects and advantages sought therefor.

While the present invention has been discussed hereabove in terms of the preferred embodiment of the invention, the invention should be appreciated to be restricted for the shown embodiment. The invention can be embodied in various ways. Therefore, the invention should be interpreted to include all possible embodiments and modifications which can be embodied without departing from the principle of the invention set out in the appended claims.

For instance, though the shown embodiment employs various parameters associated with the fluid pressure in the hydraulic circuit for detecting fluid pressure in an indirect manner therefrom, it is, of course, possible to monitor the fluid source pressure from the fluid pressure source.

What is claimed is:

1. A pressure control system for an automotive automatic power transmission having friction elements, comprising:
   a hydraulic circuit connected to the friction elements;
   a duty-controlled solenoid;
   said hydraulic circuit including means cooperating with said duty-controlled solenoid for generating a hydraulic fluid pressure, said hydraulic fluid pressure generating means including a drain port mechanically engageable with said duty controlled solenoid, said drain port being lubricated by a drain flow of hydraulic fluid upon generation of said hydraulic fluid pressure; and
   a control unit including:
   means for generating an electric control signal supplied to said duty controlled solenoid, said electric control signal varying a duty ratio at which said duty-controlled solenoid repeats two positions, including a position in which said duty-controlled solenoid engages said drain port; an
   means responsive to said hydraulic fluid pressure for holding said duty-controlled solenoid to one of said two positions when said hydraulic fluid pressure is lower than a predetermined value small enough as to allow a determination that there is no supply of hydraulic fluid to said drain port.

2. A pressure control system for an automatic power transmission of a vehicle having an internal combustion engine, comprising:
   engine speed sensor means for detecting a revolution speed of the internal combustion engine and generating an engine speed indicative signal indicative of said revolution speed detected;
   a duty-controlled solenoid;
   a hydraulic circuit including means cooperating with said duty-controlled solenoid for generating a hydraulic fluid pressure, said hydraulic fluid pressure generating means including a drain port mechanically engageable with said duty-controlled solenoid, said drain port being lubricated by drain flow of hydraulic fluid upon generation of said hydraulic fluid pressure; and
   a control unit including:
   means for generating an electric control signal supplied to said duty-controlled solenoid, said electric control signal varying a duty ratio at which said duty-controlled solenoid repeats two positions, including a position in which said duty-controlled solenoid engages said drain port; and
   means responsive at least to said engine speed indicative signal for holding said duty-controlled solenoid to one of said two positions when said engine speed indicative signal is lower than a predetermined engine speed value low enough to allow determination that there is no supply of hydraulic fluid to said drain port.

* * * * *